United States Patent [19]
Arlt, III et al.

[11] Patent Number: 5,951,061
[45] Date of Patent: Sep. 14, 1999

[54] ELASTOMERIC SUBSEA FLEX JOINT AND SWIVEL FOR OFFSHORE RISERS

[75] Inventors: Edward J. Arlt, III, San Antonio; Benton Baugh, Houston; David C. Riggs, Coppell, all of Tex.

[73] Assignee: Continental EMSCO Company, Houston, Tex.

[21] Appl. No.: 08/910,841

[22] Filed: Aug. 13, 1997

[51] Int. Cl.⁶ ........................................... F16L 7/00
[52] U.S. Cl. ..................... 285/94; 285/184; 285/223; 285/263; 192/55.3; 192/110 R
[58] Field of Search ............... 285/223, 94, 184, 285/263; 192/55.3, 110 R

[56] References Cited

U.S. PATENT DOCUMENTS

| | | | |
|---|---|---|---|
| 3,727,954 | 4/1973 | Oliver | 285/168 |
| 3,746,372 | 7/1973 | Hynes et al. | 285/95 |
| 3,952,526 | 4/1976 | Watkins et al. | 61/46 |
| 3,957,291 | 5/1976 | Edling et al. | 285/136 |
| 3,997,198 | 12/1976 | Linder | 285/98 |
| 3,998,503 | 12/1976 | Van Wyk | 308/36 R |
| 4,031,919 | 6/1977 | Ortloff et al. | 137/799 |
| 4,068,864 | 1/1978 | Herbert et al. | 285/49 |
| 4,076,284 | 2/1978 | Herbert et al. | 285/263 |
| 4,085,781 | 4/1978 | Serpas et al. | 141/1 |
| 4,121,861 | 10/1978 | Gorndt | 285/223 |
| 4,128,127 | 12/1978 | Taylor | 166/105 |
| 4,139,221 | 2/1979 | Shotbolt | 285/18 |
| 4,173,360 | 11/1979 | Bergman et al. | 285/51 |
| 4,236,737 | 12/1980 | Herbert et al. | 285/234 |
| 4,413,844 | 11/1983 | N'Guyen Duc et al. | 285/16 |
| 4,468,056 | 8/1984 | Kramer et al. | 285/281 |
| 4,478,438 | 10/1984 | Elorriaga, Jr. | 285/276 |
| 4,593,941 | 6/1986 | Whightsil, Sr. | 285/165 |
| 4,741,716 | 5/1988 | Hasebe et al. | 441/4 |
| 4,881,759 | 11/1989 | Kovitch et al. | 285/49 |
| 4,943,188 | 7/1990 | Peppel | 405/224 |
| 5,044,672 | 9/1991 | Skeels et al. | 285/98 |
| 5,098,323 | 3/1992 | Poldervaart et al. | 441/4 |
| 5,133,578 | 7/1992 | Whightsil, Sr. et al. | 285/166 |
| 5,269,629 | 12/1993 | Langner | 405/195.1 |
| 5,314,024 | 5/1994 | Rodgers et al. | 166/347 |
| 5,439,060 | 8/1995 | Huete et al. | 166/367 |
| 5,564,957 | 10/1996 | Breivik et al. | 441/5 |
| 5,615,977 | 4/1997 | Moses et al. | 405/195.1 |

OTHER PUBLICATIONS

A. Smedal and K. Syvertsen, "STL, A New Approach To Field Development," Advanced Production and Loading, APL AS, 27th Annual Offshore Technology Conference in Houston, Texas, U.S.A., May 1–4, 1995, pp. 399–405.

Liz White, "Oil fields: tough on elastomers," Oilfiled Uses, EJR, pp. 35–36, 38.

Bending Stiffeners, C.R.P. Marine, Lancashire, England, 3 pgs.

*Primary Examiner*—Dave W. Arola
*Attorney, Agent, or Firm*—Arnold White & Durkee

[57] ABSTRACT

An elastomeric flex joint is provided with a rotational bearing so that torsional stress is relieved by slip of the rotational bearing. In a first embodiment, the flex joint is designed to resist flexing from a mean position at which there is a substantial bend of axial direction, and the rotational bearing does not normally slip. An adjustment mechanism reduces the loading on the elastomeric flex element and the rotational bearing so that the bearing will slip during an initial orientation or during an adjustment of the joint. In a second embodiment, all small torsional deflections are absorbed by the elastomeric flex element, and large torsional deflections are absorbed by the rotational bearing. This is desirable because the elastomeric flex element has a greater fatigue capacity for small oscillations than the rotational bearing. An elastomeric clutch can be used to precisely control the break-out torque.

43 Claims, 4 Drawing Sheets

ELASTOMERIC SUBSEA FLEX JOINT AND SWIVEL FOR OFFSHORE RISERS

BACKGROUND OF THE INVENTION

1. Field of the Invention

This invention is generally directed to flexible joints for subsea risers and pipelines, and more particularly to a joint providing bending and rotation with respect to a longitudinal axis of the riser or pipeline.

2. Description of the Related Art

Offshore drilling and production facilities use risers or pipelines constructed of rigid pipe sections and flexible joints. This construction, for example, permits a pipeline to be laid along the under-water level and then raised for connection along the length of a supporting leg of an offshore platform. Typically, an uppermost joint near the platform is a swivel joint permitting axial rotation, and the lower joints are flex joints permitting axial bending.

One kind of flexible joint providing both swiveling and bending is a ball joint as described in Oliver U.S. Pat. No. 3,727,954. A disadvantage of such a ball joint is that the joint has no means for resisting bending of the articulated riser. Therefore, the articulated riser may assume a configuration where the joints reach their limits of displacement and permit the buildup of a high degree of stress on the joints and the connection of the riser to the floating platform.

There has been a continuing trend to use offshore drilling and production facilities in increasingly deeper water and in geographical regions such as the North Sea having harsh weather conditions. Offshore drilling and production facilities in such dynamic ocean environments can experience extreme load conditions on riser and mooring system components. Extreme weather conditions alone or in combination with equipment failures may result in rotational motions of the floating platform in multiple degrees of freedom simultaneously.

Floating drilling vessels and production facilities have recently become important components for exploration as well as large scale development of offshore oil deposits. In the case of floating production systems (FPS and FPSO), the vessel in question may be either a semi-submersible platform or a ship. If it is a ship, it will often be attached at one end to a turret which is moored to the seabed, and the vessel is free to rotate about this turret in response to wave, wind, and tidal forces. See, for example, A. Smedal and K. Syvertsen, "STL, A New Approach To Field Development," Advanced Production and Loading, APL AS, 27th Annual Offshore Technology Conference in Houston, Tex., U.S.A., 1–4 May 1995, pages 399–405, incorporated herein by reference.

Drilling ships and exploration vessels are kept on station by dynamic thrusters which are used to counteract the forces on the ship and keep it on station over the drill site. At times, natural forces and mechanical failures have caused such vessels to move off station resulting in severe damage to the riser.

For such floating drilling vessels and production facilities, it is therefore prudent to use an uppermost swivel joint in the riser near the floating vessel, and to use elastomeric flex joints along the riser in order to absorb the rotational and bending motions caused by rotation and displacement of the floating vessel about its mean position. In such instances, an uppermost joint capable of simultaneously accommodating both rotation and bending motions about the riser would be invaluable.

In the case of catenary and other types of risers suspended from tension leg platforms (TLP) and FPS Platforms (which are moored in all quadrants of the seabed), large dynamic motions in yaw, roll and pitch are still possible during extreme weather conditions. In such instances, an uppermost joint located at the riser/platform attachment point and simultaneously accommodating both angular and rotational motions about the riser would enhance the fatigue life of the riser and prevent damage. For these kinds of installations, it would also be helpful if such a joint could have a built-in mean angle identical to the hang-off angle of the riser. This would facilitate self-adjustment during pull-in and coupling of the upper section of the riser to a leg of the TLP or to a TLP or FPS receptacle.

SUMMARY OF THE INVENTION

In accordance with a basic aspect of the invention, an elastomeric flex joint is provided with a rotational bearing so that torsional stress in the elastomeric flex joint is relieved by slip of the rotational bearing. The elastomeric flex joint includes a first body having a first central passage and being adapted for coupling to a first conduit for conveying fluid between the first conduit and the first central passage, and a second body having a second central passage and coupled to the first body for flow of fluid from the first central passage to the second central passage. The second body is adapted for coupling to a second fluid conduit for conveying fluid between the second central passage and the second conduit. A first bearing is coupled to the first body and the second body for permitting flexing of the first body with respect to the second body to permit bending of axial direction of the first conduit with respect to the second conduit and for permitting swiveling of the first body with respect to the second body to permit a relative axial rotation of the first conduit with respect to the second conduit. An elastomeric flex element is coupled to the second body for resiliently resisting the flexing of the first body with respect to the second body. A rotational second bearing is coupled between the elastomeric flex element and the first body for permitting swiveling of the first body with respect to the second body.

In accordance with another aspect of the invention, a swivel joint is provided with an elastomeric clutch. The swivel joint includes a first body having a first central passage and being adapted for coupling to a first conduit for conveying fluid between the first conduit and the first central passage, and a second body having a second central passage and coupled to the first body for flow of fluid from the first central passage to the second central passage. The second body is adapted for coupling to a second fluid conduit for conveying fluid between the second central passage and the second conduit. A bearing is coupled to the first body and the second body for permitting swiveling of the first body with respect to the second body to permit relative axial rotation of the first conduit with respect to the second conduit. The elastomeric clutch is coupled between the first body and the second body for resiliently resisting swiveling up to a limit of relative axial rotation of the first conduit with respect to the second conduit. The elastomeric clutch permits relatively unresisted swiveling for swiveling in excess of the limit of relative axial rotation of the first conduit with respect to the second conduit. The elastomeric clutch includes at least one lobe engaging a region of elastomer.

In accordance with a first preferred embodiment of the invention, the flex joint is designed to resist flexing from a mean position at which there is a substantial bend of axial direction, and the rotational bearing does not normally slip. The rotational second bearing sustains a loading force on the elastomeric flex element tending to prevent rotation of the rotational second bearing due to static friction and to prevent a change in direction of the substantial bend of axial direction. A loading mechanism is provided for reducing the loading force on the elastomeric flex element to facilitate adjustment of the direction of the substantial bend of axial direction.

In a second preferred embodiment, small torsional deflections are absorbed by the flex element, and large torsional deflections are absorbed by the rotational bearing. This is desirable because the elastomeric flex element has a greater fatigue capacity for small oscillations than the rotational bearing. An elastomeric clutch is used to precisely control the break-out torque. An elastomeric sliding seal protects the elastomeric clutch from the sub-sea environment.

In accordance with another aspect, the invention provides a method of resisting the bending of axial direction of the first conduit with respect to the second conduit and resisting relative axial rotation of the first conduit with respect to the second conduit. The method includes resiliently resisting the bending of axial direction of the first conduit with respect to the second conduit in response to bending moments applied to the first conduit and the second conduit by producing opposing forces in an elastomeric flex element in the flexible joint; and resiliently resisting the relative axial rotation of the first conduit with respect to the second conduit by producing opposing forces in the elastomeric flex element for relative axial rotation up to a limit, and once the limit is exceeded, permitting substantially free rotation of the first conduit with respect to the second conduit.

In accordance with yet another aspect, the invention provides a method of orienting and adjusting an assembly of a flexible joint coupled to a first conduit and a second conduit for passage of fluid between the first conduit and the second conduit. The joint includes an elastomeric flex element for resisting bending of axial direction of the first conduit with respect to the second conduit from a mean position at which there is a substantial bend of axial direction of the first conduit with respect to the second conduit, a rotational bearing sustaining a loading force on the elastomeric flex element and permitting rotation to relieve torsional stress in the elastomeric flex element for adjusting a direction of the substantial bend of axial direction of the first conduit with respect to the second conduit, and a loading mechanism for decreasing and increasing the loading force on the elastomeric flex element. The method includes the steps of: when the loading mechanism applies a reduced loading force on the elastomeric flex element so that the rotational bearing permits rotation to relieve torsional stress in the elastomeric flex element, placing the assembly in a desired orientation having said mean position at which there is a substantial bend of axial direction of the first conduit with respect to the second conduit; and when the assembly has been placed in the desired orientation having said mean position at which there is a substantial bend of axial direction of the first conduit with respect to the second conduit, loading the adjustment mechanism to increase the loading force on the elastomeric flex element and set the direction of the substantial bend of axial direction of the first conduit with respect to the second conduit.

In accordance with a final aspect, the invention provides a method of adjusting a flexible joint coupled to a first conduit and a second conduit for passage of fluid between the first conduit and the second conduit. The joint includes an elastomeric flex element for resisting bending of axial direction of the first conduit with respect to the second conduit from a mean position at which there is a substantial bend of axial direction of the first conduit with respect to the second conduit, a rotational bearing sustaining a loading force on the elastomeric flex element and permitting rotation to relieve torsional stress in the elastomeric flex element for adjusting a direction of the substantial bend of axial direction of the first conduit with respect to the second conduit, and a loading mechanism for reducing and increasing the loading force on the elastomeric flex element. The method includes the steps of: adjusting the loading mechanism to reduce the loading force on the elastomeric flex element so that the rotational bearing permits rotation to relive torsional stress in the elastomeric flex element to facilitate adjustment of a direction of the substantial bend of axial direction of the first conduit with respect to the second conduit; adjusting the direction of the substantial bend of axial direction of the first conduit with respect to the second conduit; and adjusting the loading mechanism to increase the loading force on the elastomeric flex element and set the direction of the substantial bend of axial direction of the first conduit with respect to the second conduit.

BRIEF DESCRIPTION OF THE DRAWINGS

These and other objects and advantages of the invention will become apparent upon review of the following drawings, in which.

While the invention has been described with respect to certain preferred embodiments, it should be understood that the intention is not to limit the invention to the particular embodiments shown, but on the contrary, the intention is to cover all modifications, equivalents, and alternatives falling within the scope of the invention as defined by the appended claims.

DETAILED DESCRIPTION OF THE PREFERRED EMBODIMENTS

Figure 1:
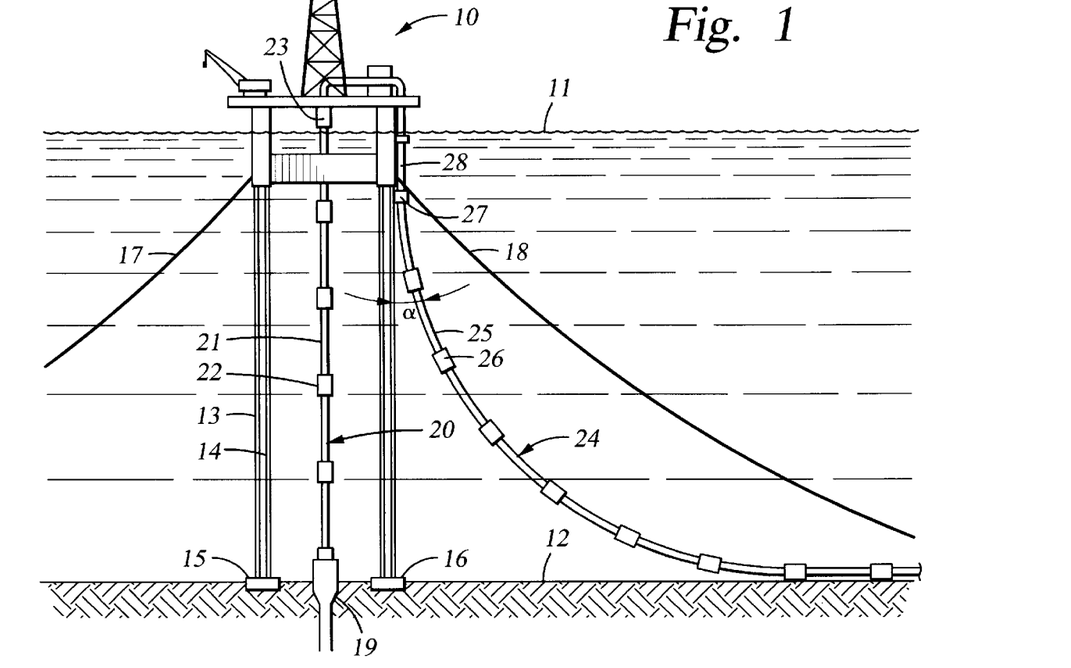
FIG. 1 is a schematic diagram of a TLP floating vessel including a production riser and an export riser in a catenary configuration.

Turning now to FIG. 1 of the drawings, there is shown an offshore drilling and production vessel generally designated 10 floating on a water surface 11. The floating vessel in particular is a tension leg platform (TLP) secured to the seabed 12 by means of tendons 13, 14 and foundation templates 15, 16. Although not visible in FIG. 1, there is a set of tendons depending from each of four corners of the TLP platform 10 to a respective one of four foundation templates 15, 16. In addition, each of the four lower corners of the TLP platform 10 is secured by a respective lateral mooring line 17, 18 used to move the platform laterally and to resist lateral storm loadings.

For conveying drilling fluids and a drill string from the TLP to a well bore 19 in the seabed 12, and for removing hydrocarbons from the well when drilling has been completed, a production riser generally designated 20 extends from the well bore 19 up to the TLP 10. The riser 20 consists of a number of rigid pipe sections 21 joined by flex joints 22. A suitable flex joint is described, for example, in Whightsil, Sr. et al. U.S. Pat. No. 5,133,578 issued Jul. 28, 1992, incorporated herein by reference. The uppermost end portion of the riser 20 includes a flexible swivel joint 23 in accordance with one embodiment of the invention. In addition to functioning as a swivel joint, the joint 23 in accordance with the invention also functions as an elastomeric flex joint. In effect, the present invention permits a savings of one flex joint in the production riser 20.

Also shown in FIG. 1 is an export riser generally designated 24 hanging from a leg of the TLP 10 in a catenary configuration and touching down on the seabed 12. The export riser 24, for example, is a pipeline from the TLP 10 to an on-shore facility (not shown). The export riser 24 is similar to the production riser 20 in that it is comprised of a number of rigid pipe sections 25 joined by elastomeric flex joints 26. In addition, the uppermost portion of the export riser 24 is connected to the TLP 10 by a swivel joint 27 in accordance with another embodiment of the present invention. The swivel joint 27 provides a savings of one flex joint 26 and further accommodates a hang-off angle a so that the upper portion of the export riser 24 can be easily attached to a vertical section of rigid pipe 28 clamped to a leg of the TLP 10.

Figure 2:
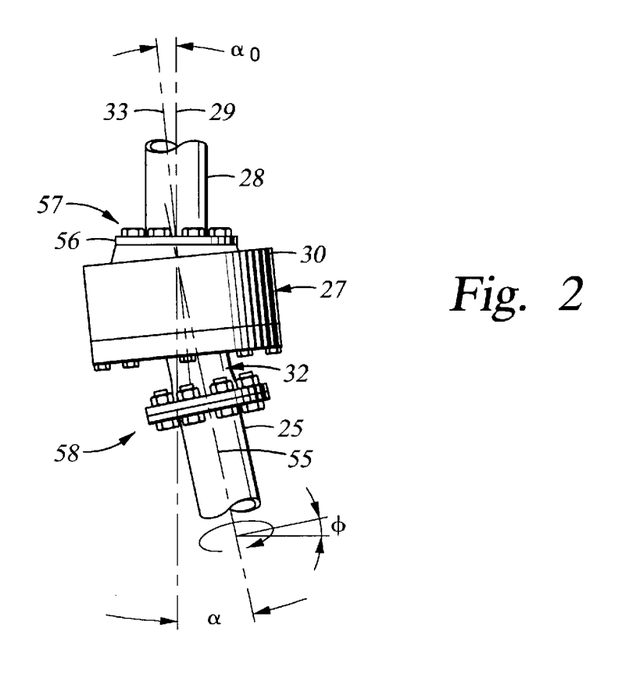
FIG. 2 is a plan view of a first embodiment of the invention for interfacing the export riser in FIG. 1 to the floating vessel.

Turning now to FIG. 2, there is shown a more detailed view of the flexible swivel joint 27 used in FIG. 1 for connecting the export riser (24 in FIG. 1) to the TLP (10 in FIG. 1). This first embodiment of the invention is especially designed for absorbing small oscillations about a mean azimuth position combined with infrequent major changes in the azimuth orientation of the export riser (24 in FIG. 1). The joint 27 has a first body 30 adapted for attachment via bolts 57 to a first conduit (the vertical pipe 28), and a second body 31 adapted for attachment via bolts 58 to a second conduit (the riser pipe section 25). The mean azimuthal position is the direction of an axis 33 of the first body 30 with respect to the direction of the axis 29 of the first conduit 28. This mean azimuthal position has a mean angle $\alpha_o$ with respect to the vertical axis 29 of the vertical pipe 28. The second body 32 and the riser pipe section 25 have a common axis 55 that makes the hang-off angle $\alpha$ with respect to the vertical axis 29 of the vertical pipe section 28.

The first body 30 is coupled to the second body 32 for flexing of the first body with respect to the second body to permit bending of axial direction 29 of the first conduit (the vertical pipe section 28) with respect to axial direction 55 the second conduit (the riser pipe section 25) and for permitting swiveling of the first body with respect to the second body to permit a relative axial rotation of the first conduit with respect to the second conduit. The hang-off angle $\alpha$ is a measure of the amount of bending of the axial direction 29 of the first conduit 28 with respect to the second conduit 25. Rotation of the first conduit 28 with respect to the second conduit 25 is depicted in FIG. 2 as an angle $\phi$ about the axis 55 of the second conduit 25.

Figure 3:
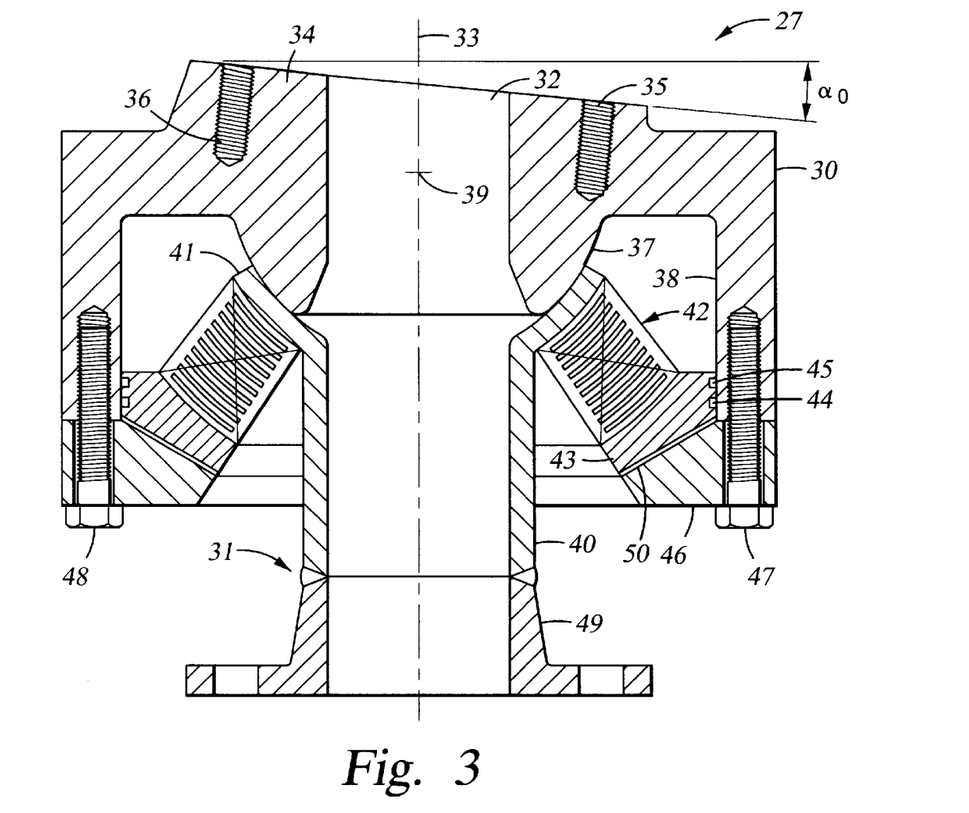
FIG. 3 is a longitudinal cross-sectional view of the first embodiment of the invention.

Turning now to FIG. 3, there is shown a cross-sectional view of the flexible swivel joint 27. The first body 30 has a central bore 32 about the longitudinal axis 33. The first body 30 and the other components of the joint 27 have radial symmetry with respect to the longitudinal axis 33, except that an upper face 34 of the first body 30 is planar and has the mean hang-off angle $\alpha_o$ with respect to a plane normal to the longitudinal axis 33. The upper face 34 has a number of threaded bores 35, 36 that are inclined and otherwise radially disposed about the longitudinal axis 34. These threaded bores 35, 36 receive bolts (57 in FIG. 2) for attachment of the first body 30 to a conventional pipe flange (56 in FIG. 2) on a lower end of the vertical pipe 28 in FIG. 2.

The inner portion of the first body 30 is formed with a semi-spherical bearing face 37 and a cylindrical bore 38. The semi-spherical bearing face 37 has a constant radius with respect to a center point 39 on the axis 33, and the cylindrical bore 38 has a constant radius with respect to the longitudinal axis 33. Within the cylindrical bore 38 there is disposed a flex bearing assembly including a cylindrical pipe 40 having an upper flared semi-spherical end portion 41, an annular elastomeric semi-spherical flex element generally designated 42, and an annular flex bearing seat 43. An upper surface of the upper flared semispherical end portion 41 is formed with a semi-spherical bearing surface in contact with the semi-spherical bearing face 37 on the first body 30. During the curing of the elastomer in the flex bearing 42, the flex bearing is bonded to a lower surface of the upper flared portion of the pipe 40 and to the annular seat 43.

Figure 4:
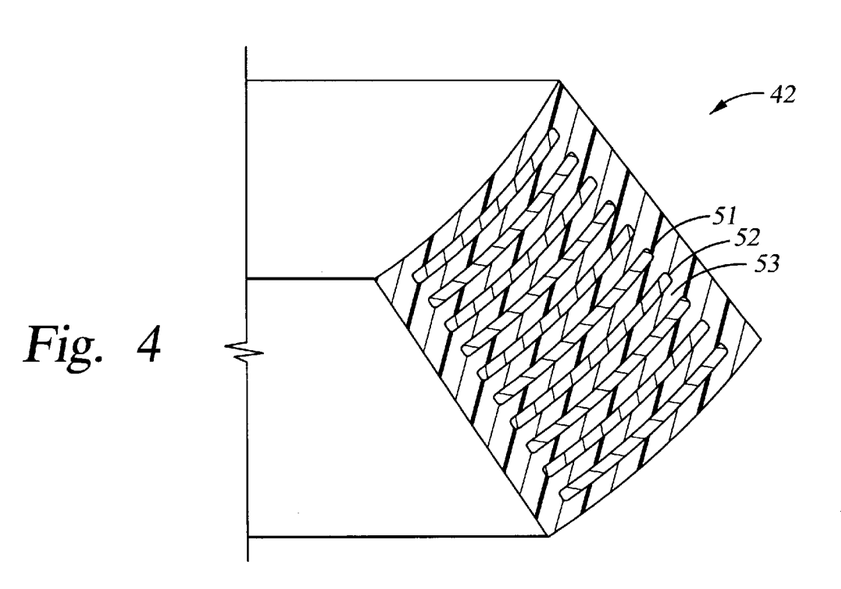
FIG. 4 is a detailed view in cross-section of the elastomeric flex element used in the flexible joint of FIG. 2.

Turning for a moment to FIG. 4, there is shown a detailed cross-section of the elastomeric flex bearing 42. This elastomeric flex bearing has a conventional laminated construction including annular steel plates 51, 52 embedded in an elastomer matrix 53. The elastomer matrix 53, for example, is a nitrile-based compound suitable for exposure to drilling and production fluids.

Returning now to FIG. 3, it is seen that an outer cylindrical surface of the flex element seat 43 is formed with annular grooves that receive two annular lip seals 44 and 45 in order to seal the interface between the seat 43 and the inner cylindrical surface 38 of the first body 30. The lip seals 44, 45, for example, are made of fluorocarbon elastomer or nitrile-based elastomer. The seat 43 itself bears against a bearing cap 46 that is secured by a number of screws 47, 48 which engage threaded bores in the first body 30. After the bearing cap 46 is put into place, a flange 49 is welded to the flared cylindrical pipe 40. The flange 49 could be welded to the flared cylindrical pipe 40 before the bearing cap 46 is put into place if the flange were to have an outer diameter smaller than the inner diameter of the bearing cap.

The flared cylindrical pipe 40 and the flange 49 comprise the second body 31 of the flexible swivel joint 27. The flange 49 provides a means for attaching the export riser (24 in FIG. 1) to the flexible swivel 27.

In order to permit unresisted swiveling of the second body 31 with respect to the first body 30, a dry lubricant layer 50 is disposed at the interface between the adjacent conical surfaces of the seat 43 and bearing cap 46. Preferably, this dry lubricant layer 50 is formed by coating one or both of the adjacent conical surfaces of the seat 43 and the bearing cap 46 with a dry lubricant material such as PTFE, Xylan, or graphite.

In use, the flexible swivel 27 is intended to require infrequent realignment of the riser azimuth orientation. An initial alignment during attachment of the export riser 24 to the vertical pipe 28 or a realignment during periodic maintenance can be performed by loosening the screws 47, 48 to relieve loading force on the elastomeric flex element 42 and between the bearing seat 43 and the bearing cap 46. A reduction of the loading force causes static friction between the seat 43 and bearing cap 46 to be reduced and overcome so that the seat 43 slips with respect to the bearing cap 46 and torsional stress on the flex element 42 is relieved. This would be done, of course, when the export riser 24 is not highly pressurized. When the export riser 24 is in a desired configuration or orientation with respect to the TLP 10, the screws 47, 48 would be re-tightened. In this fashion, the screws 47, 48 function in connection with the bearing retainer cap 46, the cylindrical bore 38 and the adjacent outer cylindrical surface of the seat 43 to provide a mechanism for decreasing and increasing the loading on the flex element 42.

In operation, all normal torsional oscillations would be absorbed by the elastomeric flex element 42 without overcoming the static friction between the seat 43 and the bearing cap 46. This would assure a greatly enhanced fatigue life for the system since the elastomeric flex element 42 is much better suited to accommodating large numbers of small motions than the mechanical bearing between the seat 43 and the bearing cap 46. However, the capacity of the flex element 42 to absorb torque is selected in relation to the static coefficient of friction of the dry lubricated bearing surface 50 between the seat 43 and bearing cap 46 so that the seat 43 will rotate with respect to the bearing cap 46 to prevent an overload of torque from being asserted on the flex element 42.

The torsional stiffness of the flex element may be engineered to be either softer or stiffer than the break-out torque of the lubricated bearing interface 50 (under load). If the interface break-out torque is greater than the stiffness of the flex element 68 (in torsion), then the flex element will deflect in shear and absorb the torsional loads up to the point where the break-out torque is reached, at which time the export riser (24 in FIG. 1) will swivel to a new orientation. If the break-out torque is less than the flex element torsional stiffness, then, of course, the flex element will not deflect in torsion and the export riser will remain rigid until the break-out torque is exceeded. Both the torsional stiffness of the flex element and the break-out torque of the bearing may be selected by design of the elastomeric flex element 42 and choice of the dry lubricant material 50 in order to achieve the dynamic characteristics desired for a given operational scenario.

Figure 5:
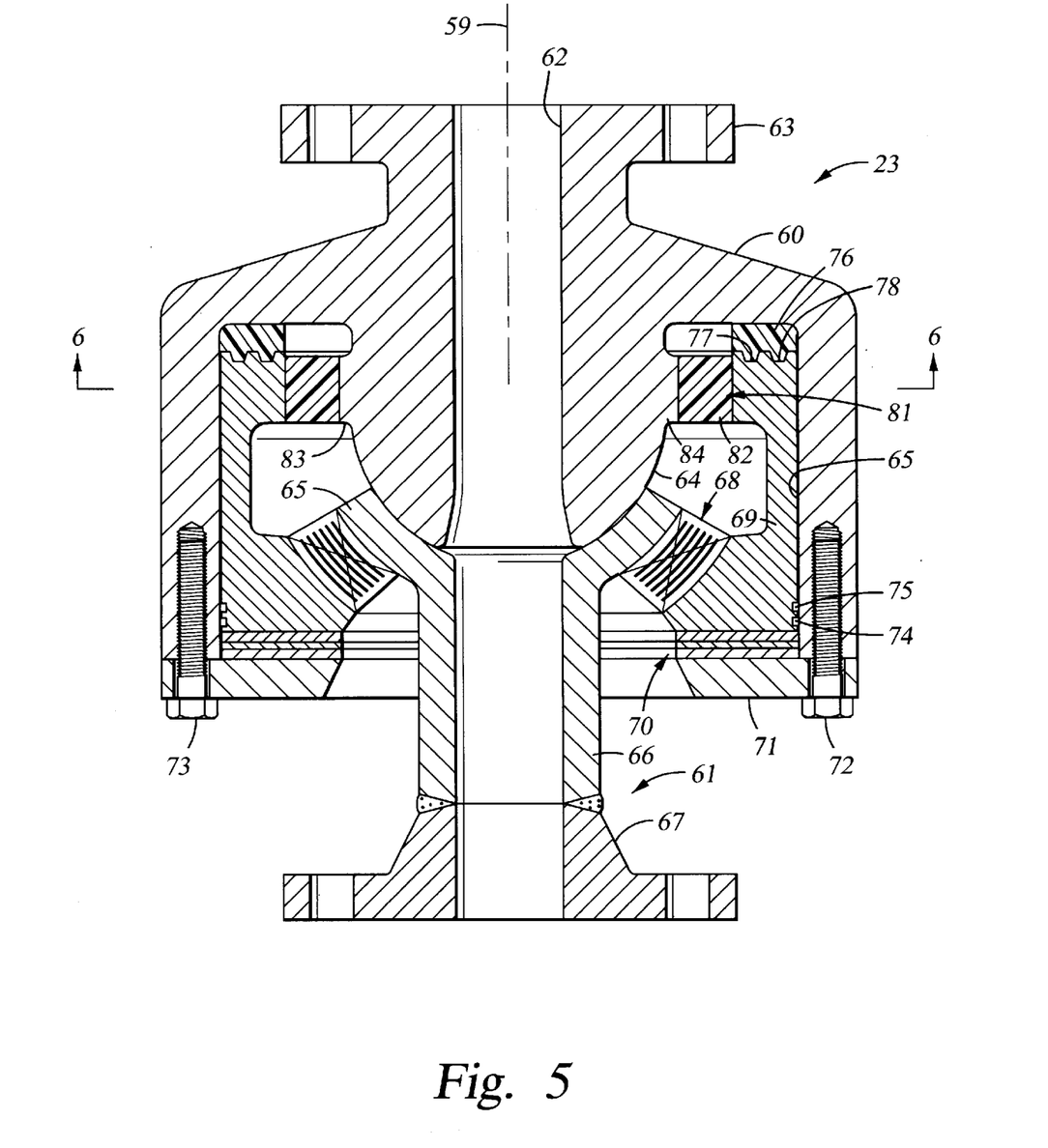
FIG. 5 is a cross-sectional view of a second embodiment of the invention used in FIG. 1 for attaching a production riser to the TLP.

Turning now to FIG. 5, there is shown a cross-sectional view of the flexible swivel 23 used for supporting the production riser (20 in FIG. 1). The components in FIG. 5 are radially symmetric with respect to a central longitudinal axis 59. The flexible swivel 23 includes a first body 60 adapted for attachment to a first conduit, and a second body 61 adapted for attachment to a second conduit. The first body 60 has a central inner bore 62, an upper flange 63, an inner semi-spherical bearing surface 64, and an inner cylindrical surface 65. The semi-spherical bearing surface 64 engages a semi-spherical flared end portion 65 of a cylindrical pipe 66 welded to a lower flange 67. The flared end portion 65 is bonded to an annular elastomeric flex element 68 which is seated on and bonded to an inner barrel 69 nested concentrically within the first body 60. The annular elastomeric flex element 68 is similar in construction to the elastomeric flex element 42 shown in FIG. 4.

The inner barrel 69 has a lower bearing surface resting upon a stack of washers generally designated 70. The washers are coated with a protective material having a very low coefficient of friction (on the order of 0.02) such as PTFE. The stack of washers 70 rest on a bearing cap 71 secured to the first body 60 by screws 72, 73. As shown in FIG. 5, three washers are included in the stack 70. The washers are made of a material such as steel that can sustain the loading.

Annular elastomeric lip seals 74, 75 (similar to the lip seals 44, 45 in FIG. 3) are disposed in annular grooves in the outer cylindrical surface of the inner barrel 69 at the cylindrical interface with the first body 60. In addition, an elastomeric annular seal 76 is provided at the top of the inner barrel 69 at an upper interface with the first body 61. This is a compression loaded elastomeric sliding seal that further assures fluid tight integrity of the flexible swivel. This seal 76 is a molded elastomer ring having annular protrusions 77, 78. The seal 76, for example, is made of made of fluorocarbon elastomer or nitrile-based elastomer.

When the seal 76 is molded, the annular protrusions 77, 78 are initially elliptical. When the flexible swivel 23 is assembled, the elliptical protrusions nest inside annular grooves in the upper portion of the inner barrel 69. The annular grooves, as well as the outer and outer cylindrical portions of the inner swivel body, are coated with PTFE. Therefore, the protrusions on the lower side of the seal 76 fill the annular grooves in the upper portion of the inner swivel body and slide therein during torsional rotations of the inner barrel 69 with respect to the first body 60.

The flexible swivel 23 as shown in FIG. 5 is intended to operate so that all small torsional deflections are absorbed within the elastomeric flex bearing 68 and all large torsional deflections are absorbed by the rotation of the inner barrel 69 with respect to the first body 60. For more precise control of the break-out torque, an elastomeric clutch generally designated 81 is interposed between the inner barrel 69 and the first body 60. The elastomeric clutch includes an elastomeric ring 82 which is bonded to the inner barrel 69 and engages lobes 83, 84 which protrude from an inner portion of the first body 60. The elastomeric ring 82, for example, is a nitrile-based compound suitable for exposure to drilling and production fluids.

Figure 6:
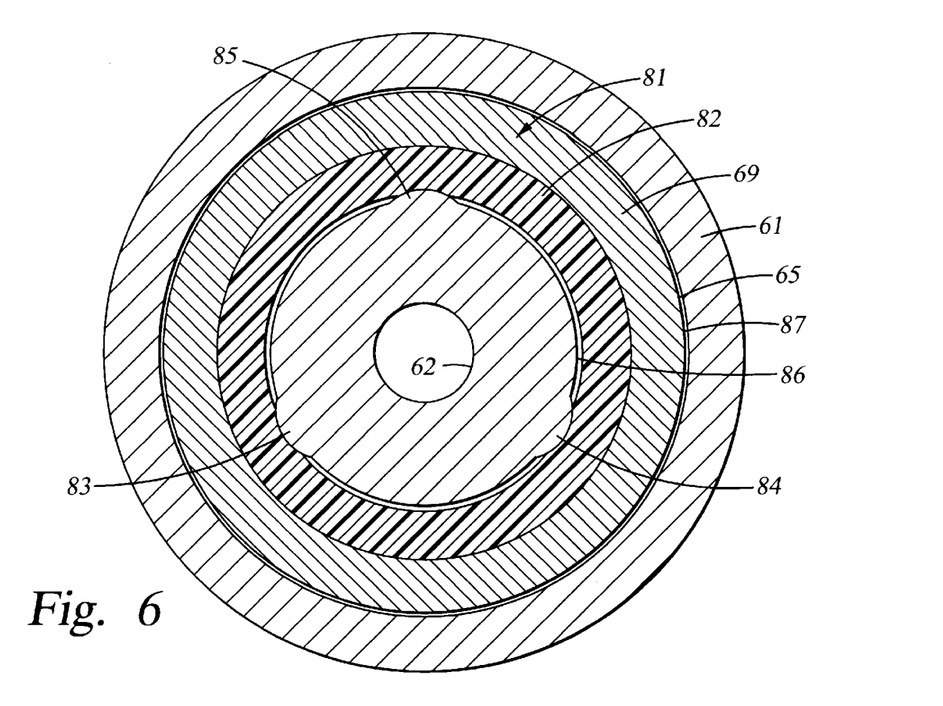
FIG. 6 is a cross-sectional view along a line 6—6 in FIG. 5 showing an elastomeric clutch in the flexible joint of FIG. 5.
Figure 7:
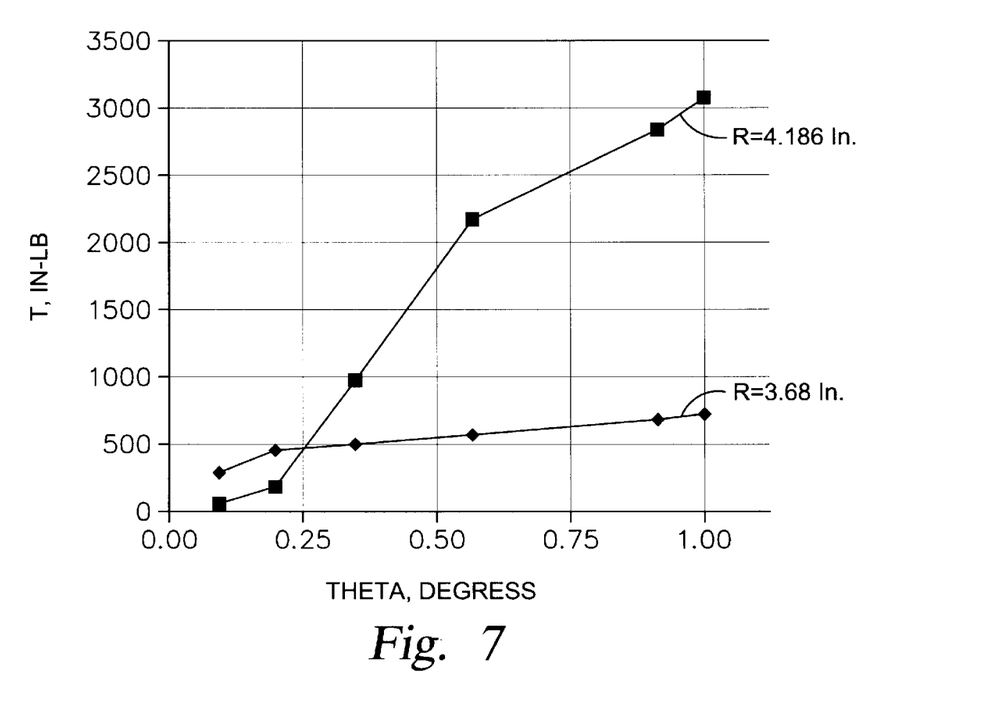
FIG. 7 is a graph of torque versus angular displacement for the elastomeric clutch of FIG. 6 and for two different amounts of penetration of the cams of the elastomeric clutch into the elastomer.

The elastomeric clutch is further illustrated in the lateral section view of FIG. 6. As seen in FIG. 6, there are three lobes 83, 84, and 85 symmetrically arranged at 120 degree intervals around the central bore 62. Each lobe protrudes into the elastomeric clutch ring 82 and otherwise a small gap 86 is visible between the inner portion of the first body 60 and the elastomeric clutch ring 82. The outer periphery of the elastomeric clutch ring 82 is bonded to the inner cylindrical surface of the inner barrel 69. Also shown in FIG. 6 is the thin layer of PTFE 87 between the inner barrel 69 and the outer portion of the first body 60.

The three stiffness contributions in torsion (the flex element 69, the clutch 81, and the bearing 70) are carefully balanced. Inclusion of the elastomeric clutch 81 in the flexible swivel 23 provides a second means for controlling the break-out torque in addition to the bearing break-out stiffness. By means of the elastomeric clutch, the elastomeric flex element 69 is shielded from major torsional oscillations which exceed a designed limit. In those instances where the torsional motion in the flex element exceeds the design limit, the clutch slips and, as a consequence, all subsequent torsional rotation is accommodated by the bearing 70.

The elastomeric clutch 81 can be designed to resist all torsional inputs up to a specific value, at which point the input load overcomes the friction between the cam lobes 83, 84, 85 and the elastomer of the elastomeric ring 82. To evaluate the break-out torque of the clutch, a representative computer model of the clutch in FIG. 6 was constructed. According to this model, the elastomeric ring 82 had an 11 inch inner diameter, a 15 inch outer diameter, and a shear modulus of 175. Two different cam penetrations into the rubber ring were modeled, including a first penetration depicted in FIG. 5 having a cam lobe radius of 3.65 inches, and a second penetration in which cam lobe radius was increased to 4.186. These results indicate that the clutch configuration as shown in FIG. 6 should be effective in resisting about 500 inch pounds of torque and then permitting rotation in response to torque exceeding about 500 inch pounds.

In view of the above, an elastomeric flex joint has been provided with a rotational bearing so that torsional stress in the elastomeric flex joint is relieved by slip of the rotational bearing. The break-out torque at which the rotational bearing slips is designed to be no more than the maximum torque that the elastomeric bearing can resist. Depending on the desired application of the flexible swivel joint, the break-out torque can be about the same or much less than the maximum torque that the elastomeric bearing can resist.

In the first embodiment, the flex joint is designed to resist flexing from a mean position at which there is a substantial bend of axial direction, and the rotational bearing does not normally slip. A loading mechanism reduces the loading on the elastomeric flex element and the rotational bearing so that the bearing will slip during an initial orientation or during an adjustment of the joint.

In the second embodiment, all small torsional deflections are absorbed by the flex element, and large torsional deflections are absorbed by the rotational bearing. This is desirable because the elastomeric flex element has a greater fatigue capacity for small oscillations than the rotational bearing. An elastomeric clutch can be used to precisely control the break-out torque.

Although specific examples have been described for the first and second embodiments, persons skilled in the art will recognize that features of the first embodiment could be combined with features of the second embodiment to satisfy the design requirements for a specific application. For example, the second embodiment could incorporate a bend or angle in the first or second body for use in a configuration in which there is normally a substantial bend between first and second conduits attached to the flexible swivel joint.

What is claimed is:

1. A conduit swivel joint comprising, in combination:
   a first body having a first central passage and being adapted for coupling to a first conduit for conveying fluid between the first conduit and the first central passage;
   a second body having a second central passage and coupled to the first body for flow of fluid from the first central passage to the second central passage, the second body being adapted for coupling to a second fluid conduit for conveying fluid between the second central passage and the second conduit, the second body also being coupled to the first body for a limited range of movement of the second body with respect to the first body;
   a first bearing coupled to the first body and to the second body for permitting flexing of the first body with respect to the second body to permit bending of axial direction of the first conduit with respect to the second conduit and for permitting swiveling of the first body with respect to the second body to permit a relative rotation of the first conduit with respect to the second conduit about an axis of the second conduit;
   an elastomeric flex element coupled to the first body and to the second body for resiliently resisting the flexing of the first body with respect to the second body; and
   a rotational second bearing coupling the elastomeric flex element to the first body for permitting swiveling of the first body with respect to the second body.

2. The conduit swivel joint as claimed in claim 1, wherein the first bearing is a spherical bearing including a first spherical surface on the first body in contact with a second spherical surface on the second body.

3. The conduit swivel joint as claimed in claim 1, wherein the rotational second bearing includes a layer of dry lubricant material.

4. The conduit swivel joint as claimed in claim 1, wherein at least one of the first body and the second body is adapted for the elastomeric flex element to resist flexing of the first body with respect to the second body starting from a mean position at which there is a substantial bend of axial direction of the first conduit with respect to the second conduit.

5. The conduit swivel joint as claimed in claim 1, wherein the elastomeric flex element absorbs and resiliently resists swiveling up to a limit of relative rotation of the first conduit with respect to the second conduit about the axis of the second conduit, and the rotational bearing overcomes static friction and permits substantially unresisted swiveling for swiveling in excess of the limit of relative rotation of the first conduit with respect to the second conduit about the axis of the second conduit.

6. The conduit swivel joint as claimed in claim 1, further including an elastomeric clutch coupled between the first body and the second body for resiliently resisting swiveling up to a break-out torque at a limit of relative rotation of the first conduit with respect to the second conduit about the axis of the second conduit, and for permitting substantially unresisted swiveling for swiveling in excess of the limit of relative rotation of the first conduit with respect to the second conduit about the axis of the second conduit.

7. The conduit swivel joint as claimed in claim 6, wherein the elastomeric clutch includes at least one lobe engaging an annular region of elastomer.

8. The conduit swivel joint as claimed in claim 1, wherein a rotational loading force on the elastomeric flex element is applied to the rotational second bearing.

9. The conduit swivel joint as claimed in claim 1, wherein the elastomeric flex element includes metal laminations embedded in a matrix of elastomer.

10. The conduit swivel joint as claimed in claim 1, further including an annular elastomeric seal disposed between the rotational second bearing and the first body.

11. A flexible joint comprising, in combination:
   a first body having a first central passage and being adapted for coupling to a first conduit for conveying fluid between the first conduit and the first central passage;
   a second body having a second central passage and coupled to the first body for flow of fluid from the first central passage to the second central passage, the second body being adapted for coupling to a second fluid conduit for conveying fluid between the second central passage and the second conduit, the second body also being coupled to the first body for a limited range of movement of the second body with respect to the first body;
   a first bearing coupled to the first body and the second body for permitting flexing of the first body with respect to the second body to permit bending of axial direction of the first conduit with respect to the second conduit;

an elastomeric flex element coupled to the first body and to the second body for resiliently resisting the flexing of the first body with respect to the second body and resisting swiveling of the first body with respect to the second body; and a rotational second bearing coupling the first body to the second body for permitting rotation to relieve torsional strain in the elastomeric flex element due to swiveling of the first body with respect to the second body;

wherein at least one of the first body and the second body is adapted for the elastomeric flex element to resist flexing of the first body with respect to the second body starting from a mean position at which there is a substantial bend of axial direction of the first conduit with respect to the second conduit, the rotational second bearing sustains a loading force on the elastomeric flex element tending to resist rotation of the rotational second bearing due to static friction; and further comprising a loading mechanism for permitting the loading force on the elastomeric flex element to be reduced to facilitate adjustment of the direction of the substantial bend of axial direction of the first conduit with respect to the second conduit.

12. The flexible joint as claimed in claim 11, wherein the loading mechanism includes a plurality of screws that secure a bearing retainer to the first body for retaining the first bearing and the rotational second bearing between the first body and the second body.

13. A conduit swivel joint comprising, in combination:

a first body having a first central passage and being adapted for coupling to a first conduit for conveying fluid between the first conduit and the first central passage;

a second body having a second central passage and coupled to the first body for flow of fluid from the first central passage to the second central passage, the second body being adapted for coupling to a second fluid conduit for conveying fluid between the second central passage and the second conduit, the second body also being coupled to the first body for a limited range of movement of the second body with respect to the first body;

the second body including a tube having a flared end portion, the flared end portion having a first surface, the first body having a second surface engaging the first surface to form a first bearing for permitting flexing of the first body with respect to the second body to permit bending of axial direction of the first conduit with respect to the second conduit and for permitting swiveling of the first body with respect to the second body to permit a relative rotation of the first conduit with respect to the second conduit about an axis of the second conduit; and an elastomeric flex element coupled to the second body and to the first body for resiliently resisting the flexing of the first body with respect to the second body and resisting swiveling of the first body with respect to the second body, the elastomeric flex element having a first portion and a second portion, the first portion of the elastomeric flex element being secured to the flared end portion of the second body; and a rotational second bearing coupling the second portion of the elastomeric flex element to the first body for permitting the swiveling of the first body with respect to the second body.

14. The conduit swivel joint as claimed in claim 13, wherein at least one of the first body and the second body is adapted for the elastomeric flex element to resist flexing of the first body with respect to the second body starting from a mean position where there is a substantial bend of axial direction of the first conduit with respect to the second conduit.

15. The conduit swivel joint as claimed in claim 13, the rotational bearing includes a stack of metal washers coated with a low-friction material.

16. The conduit swivel joint as claimed in claim 13, further including a bearing cap fastened to the first body for retaining the rotational bearing in a concentric orientation within the first body.

17. The conduit swivel joint as claimed in claim 13, further including an elastomeric clutch coupled between the first body and the second body for resiliently resisting swiveling up to a break-out torque at a limit of relative rotation of the first conduit with respect to the second conduit about the axis of the second conduit, and the elastomeric clutch permitting relatively unresisted swiveling for swiveling in excess of the limit of relative rotation of the first conduit with respect to the second conduit about the axis of the second conduit.

18. The conduit swivel joint as claimed in claim 17, wherein the elastomeric clutch includes at least one lobe engaging a region of elastomer.

19. The conduit swivel joint as claimed in claim 17, wherein the rotational second bearing is cylindrical and has a seat to which the elastomeric flex element is secured, and the elastomeric clutch is fastened to a portion of the rotational second bearing that is axially displaced from the seat.

20. The conduit swivel joint as claimed in claim 19, further including an annular elastomeric sliding seal disposed between the rotational second bearing and the first body for preventing fluid transfer between the seat and the elastomeric clutch.

21. A conduit swivel joint comprising, in combination:

a first body having a first central passage and being adapted for coupling to a first conduit for conveying fluid between the first conduit and the first central passage;

a second body having a second central passage and coupled to the first body for flow of fluid from the first central passage to the second central passage, the second body being adapted for coupling to a second fluid conduit for conveying fluid between the second central passage and the second conduit, the second body also being coupled to the first body for a limited range of movement of the second body with respect to the first body;

a bearing coupled to the first body and the second body for permitting swiveling of the first body with respect to the second body to permit a relative rotation of the first conduit with respect to the second conduit about an axis of the second conduit; and an elastomeric clutch coupled between the first body and the second body for resiliently resisting swiveling up to a break-out torque at a limit of relative rotation of the first conduit with respect to the second conduit about the axis of the second conduit, and the elastomeric clutch permitting relatively unresisted swiveling for swiveling in excess of the limit of relative rotation of the first conduit with respect to the second conduit about the axis of the second conduit, the elastomeric clutch including at least one lobe engaging a region of elastomer.

22. The conduit swivel joint as claimed in claim 21, wherein the region of elastomer is annular, and the elastomeric clutch includes a plurality of lobes arranged in a symmetric fashion around a central region, and each of the plurality of lobes engages the annular region of elastomer.

23. The conduit swivel joint as claimed in claim 22, wherein the lobes are formed on a central region of one of the first and second bodies, and the annular region of elastomer is secured to another of the first and second bodies.

24. In a system having a first conduit joined by a flexible joint to a second conduit for passage of fluid between the first conduit and the second conduit, a method of resisting bending of axial direction of the first conduit with respect to the second conduit and resisting relative rotation of the first conduit with respect to the second conduit about an axis of the second conduit, the method of comprising the steps of:
 a) resiliently resisting the bending of axial direction of the first conduit with respect to the second conduit in response to bending moments applied to the first conduit and the second conduit by producing opposing forces in an elastomeric flex element in the flexible joint;
 b) resiliently resisting the relative rotation of the first conduit with respect to the second conduit about the axis of the second conduit by producing opposing forces in the elastomeric flex element for relative rotation up to a limit, and once the limit is exceeded without failure of the elastomeric flex element, permitting substantially free rotation of the first conduit with respect to the second conduit about the axis of the second conduit.

25. The method as claimed in claim 24, which further includes decreasing the limit, rotating the first conduit with respect to the second conduit about the axis of the second conduit, and then increasing the limit.

26. The method as claimed in claim 25, which includes turning screws in the flexible joint in order to decrease a loading force on the elastomeric flex element and the rotational bearing and thereby decrease the limit.

27. In a system having a first conduit joined by a flexible joint to a second conduit for passage of fluid between the first conduit and the second conduit, a method of resisting bending of axial direction of the first conduit with respect to the second conduit and resisting relative rotation of the first conduit with respect to the second conduit about an axis of the second conduit, the method of comprising the steps of:
 a) resiliently resisting the bending of axial direction of the first conduit with respect to the second conduit in response to bending moments applied to the first conduit and the second conduit by producing opposing forces in an elastomeric flex element in the flexible joint; and
 b) resiliently resisting the relative rotation of the first conduit with respect to the second conduit about the axis of the second conduit by producing opposing forces in the elastomeric flex element for relative rotation up to a limit, and once the limit is exceeded, permitting substantially free rotation of the first conduit with respect to the second conduit about the axis of the second conduit, wherein the limit is set by a coefficient of static friction of a rotational bearing in the elastomeric flex element, and the rotational bearing has bearing surfaces that slip when the limit is exceeded.

28. The method as claimed in claim 27, wherein the limit is set by a n elastomeric clutch, and the elastomeric clutch slips when the limit is exceeded.

29. A method of orienting and adjusting an assembly of a flexible joint coupled to a first conduit and a second conduit for passage of fluid between the first conduit and the second conduit, the joint including an elastomeric flex element for resisting bending of axial direction of the first conduit with respect to the second conduit from a mean position at which there is a substantial bend of axial direction of the first conduit with respect to the second conduit, a rotational bearing sustaining a loading force on the elastomeric flex element and permitting rotation to relieve torsional stress in the elastomeric flex element for adjusting a direction of the substantial bend of axial direction of the first conduit with respect to the second conduit, and a loading mechanism for reducing and increasing the loading force on the elastomeric flex element, the method comprising the steps of:
 a) when the loading mechanism applies a reduced loading force on the elastomeric flex element so that the rotational bearing permits rotation to relieve torsional stress in the elastomeric flex element, placing the assembly in a desired orientation having said mean position at which there is a substantial bend of axial direction of the first conduit with respect to the second conduit; and
 b) when the assembly has been placed in the desired orientation having said mean position at which there is a substantial bend of axial direction of the first conduit with respect to the second conduit, adjusting the [adjustment] loading mechanism to increase the loading force on the elastomeric flex element, and thereby set the direction of the substantial bend of axial direction of the first conduit with respect to the second conduit.

30. The method as claimed in claim 29, which includes turning screws in the loading mechanism to increase the loading force on the elastomeric flex element.

31. A method of adjusting a flexible joint coupled to a first conduit and a second conduit for passage of fluid between the first conduit and the second conduit, the joint including an elastomeric flex element for resisting bending of axial direction of the first conduit with respect to the second conduit from a mean position at which there is a substantial bend of axial direction of the first conduit with respect to the second conduit, a rotational bearing sustaining a loading force on the elastomeric flex element and permitting rotation to relieve torsional stress in the elastomeric flex element for adjusting a direction of the substantial bend of axial direction of the first conduit with respect to the second conduit, and a loading mechanism for reducing and increasing the loading force on the elastomeric flex element, the method comprising the steps of:
 a) adjusting the loading mechanism to reduce the loading force on the elastomeric flex element so that the rotational bearing permits rotation to relieve torsional stress in the elastomeric flex element to facilitate adjustment of a direction of the substantial bend of axial direction of the first conduit with respect to the second conduit;
 (b) adjusting the direction of the substantial bend of axial direction of the first conduit with respect to the second conduit; and then
 (c) adjusting the loading mechanism to increase the loading force on the elastomeric flex element, and thereby set the direction of the substantial bend of axial direction of the first conduit with respect to the second conduit.

32. The method as claimed in claim 31, which includes turning screws in the loading mechanism to reduce or increase the loading force on the elastomeric flex element.

33. A conduit swivel joint comprising, in combination:
 a first body having a first central passage and being adapted for coupling to a first conduit for conveying fluid between the first conduit and the first central passage;

a second body having a second central passage and coupled to the first body for flow of fluid from the first central passage to the second central passage, the second body being adapted for coupling to a second fluid conduit for conveying fluid between the second central passage and the second conduit, the second body also being coupled to the first body for a limited range of movement of the second body with respect to the first body;

the first body having a semi-spherical bearing face, and the second body having a flared semi-spherical end portion contacting the semi-spherical bearing face to form a bearing coupled to the first body and the second body for permitting flexing of the first body with respect to the second body to permit bending of axial direction of the first conduit with respect to the second conduit and for permitting swiveling of the first body with respect to the second body to permit a relative rotation of the first conduit with respect to the second conduit about an axis of the second conduit;

an annular elastomeric flex element disposed around the second body, the annular elastomeric flex element having a first end portion bonded to a surface of the flared semi-spherical end portion opposite to a surface of the flared semi-spherical end portion that is contacting the semi-spherical bearing face, an annular seat disposed around the second body, the annular seat being bonded to a second end portion of the annular elastomeric flex element; and an annular bearing cap disposed around the second body and secured to the first body, the annular seat and the annular elastomeric flex element and the flared semi-spherical end portion of the second body being disposed between the annular bearing cap and the semi-spherical bearing face of the first body, the annular bearing cap bearing against the annular seat for applying a loading force upon the annular elastomeric flex element to maintain the flared semi-spherical end portion of the second body in contact with the semi-spherical bearing face of the first body and for permitting relative rotation of the annular seat with respect to the annular bearing cap to permit swiveling of the first body with respect to the second body.

34. The conduit swivel joint as claimed in claim 33, which further includes a layer of dry lubricant material disposed between the annular seat and the annular bearing cap.

35. The conduit swivel joint as claimed in claim 33, which further includes a stack of metal washers which are coated with a low-friction material and are disposed between the annular seat and the annular bearing cap.

36. The conduit swivel joint as claimed in claim 33, wherein the first body is formed with a cylindrical cavity, the semi-spherical bearing face of the first body is disposed within the cylindrical cavity, and the conduit swivel joint further includes an annular elastomeric seal disposed between the annular seat and a cylindrical surface of the cylindrical cavity.

37. The conduit swivel joint as claimed in claim 33, wherein the first body is adapted for the elastomeric flex element to resist flexing of the first body with respect to the second body starting from a mean position at which there is a substantial bend of axial direction of the first conduit with respect to the second conduit.

38. The conduit swivel joint as claimed in claim 33, wherein the first body has a planar end face that is inclined at an angle with respect to a plane normal to a longitudinal axis of the first body.

39. The conduit swivel joint as claimed in claim 33, wherein the elastomeric flex element absorbs and resiliently resists swiveling up to a limit of relative rotation of the first conduit with respect to the second conduit about an axis of the second conduit, the annular seat being stationary with respect to the annular bearing cap for swiveling up to the limit of relative rotation of the second conduit about the axis of the second conduit, and the annular seat rotating with respect to the annular bearing cap for swiveling in excess of the limit of relative rotation of the second conduit about the axis of the second conduit.

40. The conduit swivel joint as claimed in claim 33, further including an elastomeric clutch coupled between the first body and the second body for resiliently resisting swiveling up to a limit of relative rotation of the first conduit with respect to the second conduit about the axis of the second conduit, and for permitting substantially unresisted swiveling for swiveling in excess of the limit of relative rotation of the first conduit with respect to the second conduit about the axis of the second conduit.

41. The conduit swivel joint as claimed in claim 40, wherein the elastomeric clutch includes at least one lobe engaging an annular region of elastomer.

42. The conduit swivel joint as claimed in claim 40, wherein the first body is formed with a cylindrical cavity, the semi-spherical bearing face of the first body is disposed within the cylindrical cavity, and the elastomeric clutch is disposed within the cylindrical cavity between an inner portion of the first body and a cylindrical extension of the annular seat that extends within the cylindrical cavity.

43. The conduit swivel joint as claimed in claim 33, wherein the annular bearing cap is secured to the first body by a plurality of screws which can be loosened to decrease the loading force upon the elastomeric flex element to facilitate adjustment of the direction of the substantial bend of axial direction of the first conduit with respect to the second conduit.

* * * * *

UNITED STATES PATENT AND TRADEMARK OFFICE
CERTIFICATE OF CORRECTION

PATENT NO.   : 5,951,061

DATED        : September 14, 1999

INVENTOR(S)  : Edward J. Arlt III et al.

It is certified that error appears in the above-identified patent and that said Letters Patent is hereby corrected as shown below:

Column 13, line 64 (claim 28), change "a n" to --an--.

Column 14, line 24 (claim 29), delete "[adjustment]".

Signed and Sealed this

Eleventh Day of April, 2000

*Attest:*

Q. TODD DICKINSON

*Attesting Officer*         *Director of Patents and Trademarks*